US006656243B2

(12) United States Patent
Hodge

(10) Patent No.: US 6,656,243 B2
(45) Date of Patent: Dec. 2, 2003

(54) FILTERED AIR VENT

(76) Inventor: Joseph Hodge, 2249 St. Rte. 50, Batavia, OH (US) 45103

( * ) Notice: Subject to any disclaimer, the term of this patent is extended or adjusted under 35 U.S.C. 154(b) by 51 days.

(21) Appl. No.: 10/068,057

(22) Filed: Feb. 6, 2002

(65) Prior Publication Data

US 2003/0145568 A1 Aug. 7, 2003

(51) Int. Cl.$^7$ .............................................. B01D 29/52
(52) U.S. Cl. ........................... 55/418; 55/484; 55/486; 55/489; 55/500; 55/511; 55/521; 55/DIG. 31; 55/DIG. 35
(58) Field of Search ..................... 55/418, 484, 486, 55/489, 500, 511, 521, DIG. 31, DIG. 35

(56) References Cited

U.S. PATENT DOCUMENTS

| | | |
|---|---|---|
| 1,854,569 A | 4/1932 | Welch |
| 3,040,501 A | 6/1962 | Pietsch |
| 3,458,130 A | 7/1969 | Juhlin |
| 3,494,113 A | 2/1970 | Kinney |
| 4,104,170 A | 8/1978 | Nedza |
| 4,323,374 A | 4/1982 | Shinagawa et al. |
| 4,418,662 A | 12/1983 | Engler et al. |
| 4,514,197 A | 4/1985 | Armbruster |
| 4,827,901 A | 5/1989 | Jackson et al. |
| 4,876,951 A | 10/1989 | Vork |
| 4,904,288 A | 2/1990 | d'Augereau |
| 5,129,929 A | 7/1992 | Linnersten |
| 5,240,479 A | 8/1993 | Bachinski |
| 5,302,354 A | 4/1994 | Watvedt et al. |
| 5,306,321 A | 4/1994 | Osendorf |
| 5,320,096 A * | 6/1994 | Hans ..................... 55/DIG. 35 |
| 5,332,426 A | 7/1994 | Tang et al. |
| 5,350,620 A | 9/1994 | Sundet et al. |
| 5,470,363 A | 11/1995 | Leader et al. |
| 5,501,794 A | 3/1996 | Van de Graaf et al. |
| 5,505,852 A | 4/1996 | van Rossen |
| 5,525,145 A | 6/1996 | Hodge |
| 5,620,503 A | 4/1997 | Miller et al. |
| D402,356 S | 12/1998 | Hodge |
| 6,033,304 A | 3/2000 | Haynes |
| 6,165,240 A | 12/2000 | Hodge |
| 6,171,354 B1 | 1/2001 | Johnson |
| 6,203,592 B1 * | 3/2001 | Carawan ................. 55/DIG. 31 |
| 6,241,794 B1 | 6/2001 | Jadran et al. |

OTHER PUBLICATIONS

Web Products, Inc., Web Page, http://www.webproducts.com, 2 pages.
Dayus Register & Grill, Inc., Web Page, http://www.dayus.com, 7 pages.

* cited by examiner

Primary Examiner—Blaine Copenheaver
Assistant Examiner—Minh-Chau T. Pham
(74) Attorney, Agent, or Firm—Steven J. Rosen

(57) ABSTRACT

A filtered air vent has a housing with an inlet and outlet, at least one set of spaced apart airflow control elements extending across the housing elements, spaces between the elements, and a pleated filter disposed within the housing. The filter has alternating first and second pleats that open up in opposite first and second directions, respectively. In one exemplary embodiment of the invention, at least a portion of the pleats that open in a first one of the directions are disposed across the spaces between the elements. The filter may be made from a washable filter material such as, for example, woven polypropylene. The elements in one embodiment of the invention are rotatable blades of a damper disposed within the housing and each of the blades are disposed within a corresponding one of the pleats that open in the second direction.

39 Claims, 6 Drawing Sheets

FILTERED AIR VENT

BACKGROUND OF THE INVENTION

1. Field of the Invention

This invention relates to filters disposed in air outlets also referred to as air vents, which includes, vent grilles and air registers and, more particularly, to air vents having blades for controlling the flow of air through an opening and filter material disposed within the air outlets.

2. Discussion of the Background Art

Air outlets, also referred to as air vents, for ducts of ventilation systems, heating and air conditioning, come in many sizes, shapes, and degrees of complexity. Among the types are grilles with fixed blades, grilles with adjustable blades, registers, registers with dampers having opposed rotatable blades and others. Duct air vents are made for mounting on floors, walls, and ceilings. Air outlets are also made for use with ceiling plenums.

Air vents for flush mounting to a wall, floor, or ceiling of an interior space at an opening into the interior space are used to direct airflow into and out of the interior space using fixed angle and/or adjustable angle blades. Some air vents and, in particular, air registers control volumetric airflow through with dampers which are adjustable blades pivotably mounted within a box-like housing or frame of the register. Blades may also be used to direct the direction of the air flow. Some air vents have removable or fixed grilles with fixed or adjustable blades mounted to an outlet of the housing or frame. U.S. Pat. No. 6,033,304 illustrates an air register with adjustable blades.

The use of air filters to remove particulate matter from an airflow is well known. Modern air filters are generally comprised of a filtering media and a support means to provide support to the filtering media. Recent air filtering techniques have included the direct mounting of filtering media to the exterior surface of an air supply or air return air vent such as is found in certain forced air heating, ventilation, and air conditioning (HVAC) systems. Filter grilles available from commercial sources such as Dayus Register & Grille in Windsor, Ontario, Canada provide flat filter material within air vents such as behind grilles of air registers. Dayus is a manufacturer of supply and return grilles.

U.S. Pat. No. 6,171,354 illustrates a filtering device for use with an air register. The filtering device includes a filter substrate that filters particulate matter from air flowing through it and an adhesive layer disposed in a discontinuous pattern on the filter substrate to permit removable attachment of the filter substrate to the register. WEB Products, Inc. of Kansas City, Kans. offers vent filters that are flat strips made of a self-charging electrostatic material designed to trap dirt, dust, smoke, and pollen size particles when air flows through the filter. The strips are designed to be placed in the bottom or the opening of the air register.

It is desirable to have an inexpensive and highly efficient air filter for use with air vents. Particularly desirable is a filtered air vent that uses available air vents. It is desirable to have an efficient air filter which is easily used in present day construction and retrofitting in existing air cooling and heating forced air ventilation systems which is easily removed and has a washable filter media for use in air cooling and heating systems. It is desirable to have an efficient air vent and filter that is easily accessible for replacement and cleaning by the consumer.

The present invention provides air filters for air filtered grilles and registers to remove particulate matter from an airflow that is very effective and easy to use, install, and clean. The present invention provides such filters that are pleated and, thus, offer more filter area which in turn provides more filtering and better filtering capability in grilles and registers. Air filters for air filtered grilles and registers of the present invention are inexpensive and highly efficient for use in both new and existing air cooling and heating forced air ventilation systems.

SUMMARY OF THE INVENTION

A filtered air vent has a housing with an inlet and outlet, at least one set of spaced apart airflow control elements extending across the housing elements, spaces between the elements, and a pleated filter disposed within the housing. In one exemplary embodiment of the invention, the pleated filter includes panels, each two adjoining panels form a pleat, panels are angled apart from each other along pleat lines, and at least a portion of the pleats are disposed across the spaces between the elements. The filter is made from a washable filter material such as, for example, woven polypropylene. The filter has opposite first and second sides of the filter, pleat-lines between each pair of adjoining panels, and an acute angle between each pair of the adjoining panels of each pleat. The acute angles have apexes along the pleat lines. The pleat lines may extend into the filter a portion of a thickness of the filter between the opposite first and second sides forming recesses along the pleat lines that open up to the acute angles. Adjoining ones of the pleat lines may be on opposite ones of the first and second sides. The filter has alternating first and second pleats that open up in opposite first and second directions, respectively.

In a more particular embodiment of the invention, the elements are rotatable blades of a damper disposed within the housing. A face-plate having a central area with openings covers the outlet and the rotatable blades are disposed between the inlet and the outlet. At least one of the rotatable blades is disposed within one of the pleats or in the acute angle between two of the panels in one of the pleats of the pleated filter. The rotatable blades may be disposed at or near the outlet. In another embodiment, the elements are fixed vanes disposed at or near the outlet.

BRIEF DESCRIPTION OF THE DRAWINGS

The novel features believed characteristic of the present invention are set forth and differentiated in the claims. The invention, together with further objects and advantages thereof, is more particularly described in conjunction with the accompanying drawings in which:

DETAILED DESCRIPTION

Figure 1:
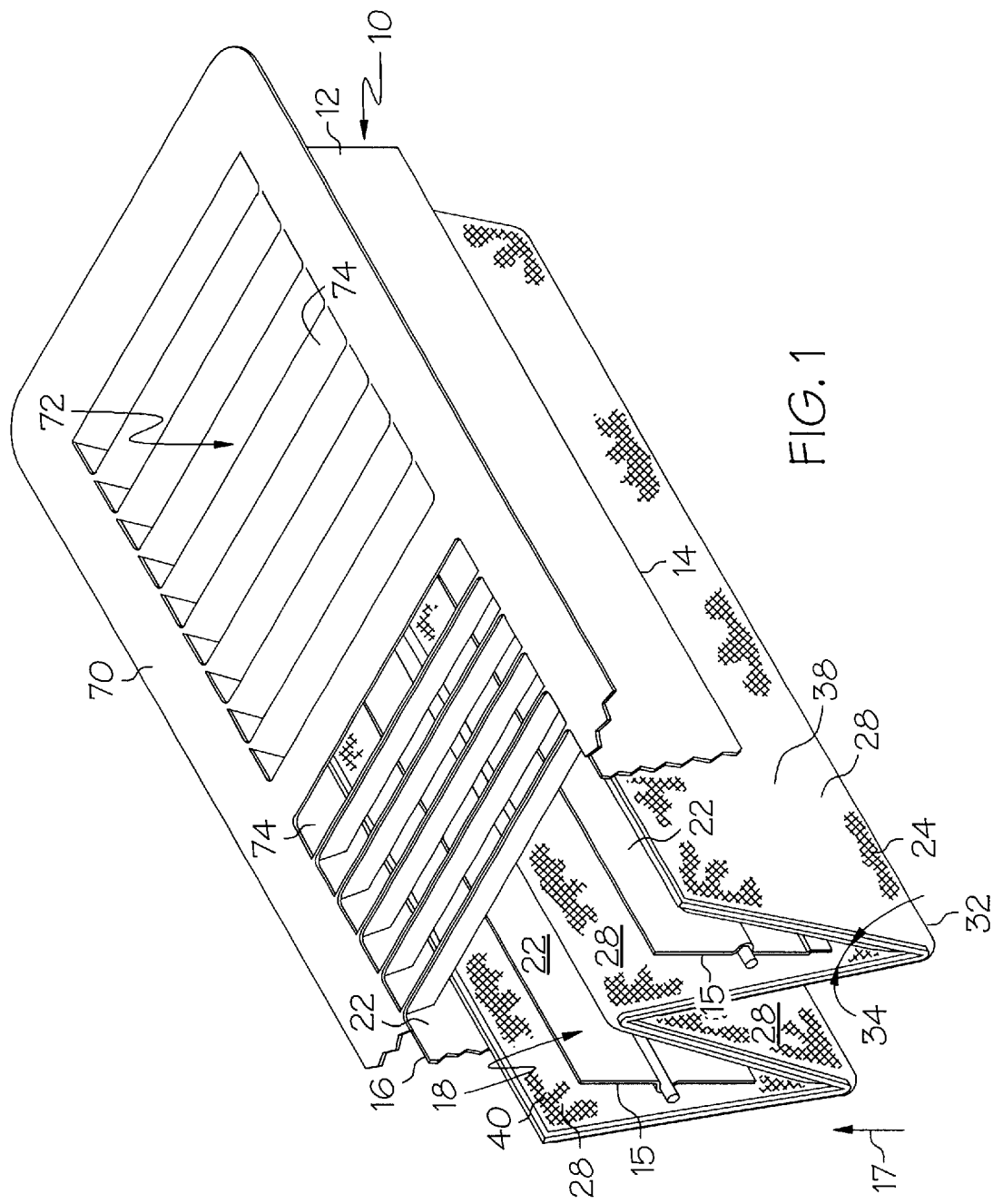
FIG. 1 is a partial cut-a-way perspective view illustration of an air register having a pleated filter disposed within.
Figure 2:
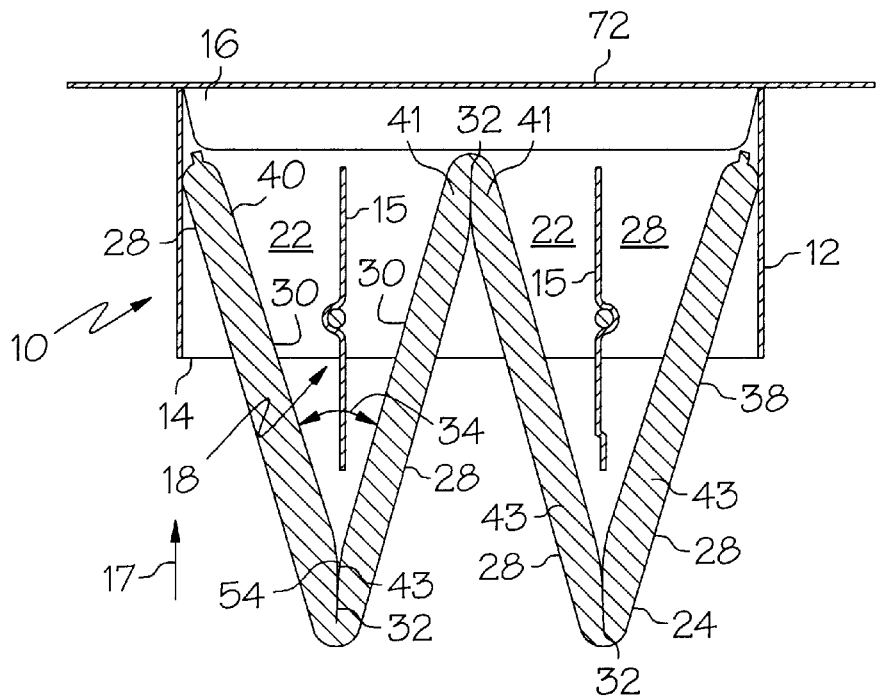
FIG. 2 is a cross-sectional view illustration of the air register having the pleated filter disposed between blades of the register illustrated in FIG. 1.

Illustrated in FIGS. 1 and 2 is a register 10 and pleated primary filter 24 that is representative of an exemplary embodiment of a filtered air vent of the present invention. There are many types of air vents used in residential, commercial, and industrial applications. Air vents typically have grilles with fixed and/or adjustable angle blades and may be referred to as registers. The register 10 is designed for residential and commercial applications and for mounting on a floor and is similar to the register in U.S. Pat. No. 6,033,304.

Figure 3:
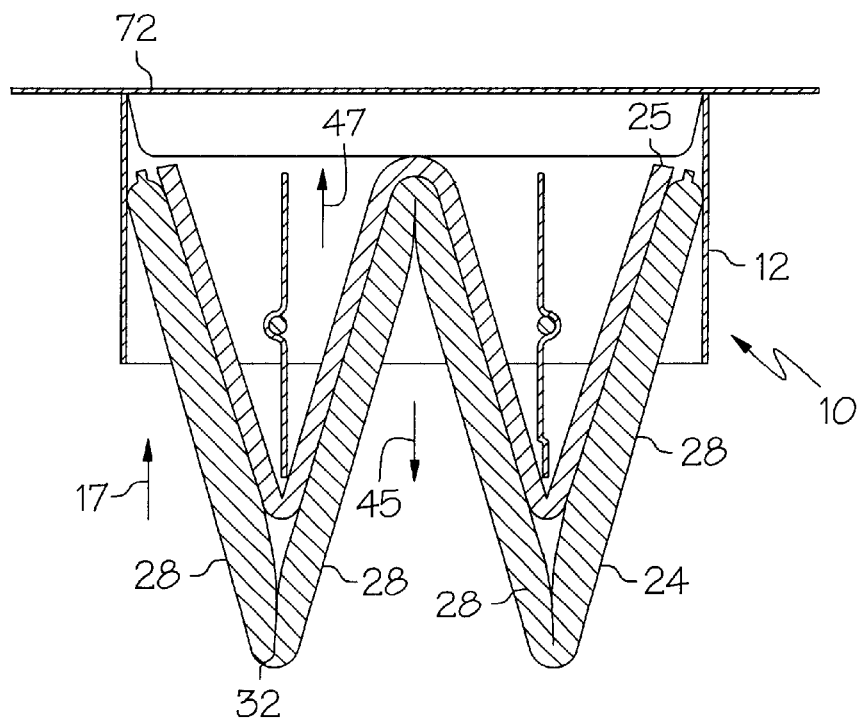
FIG. 3 is a cross-sectional view illustration of the air register having the pleated filter and a disposable pleated charcoal filter disposed between blades of the register illustrated in FIG. 1.

The register 10 includes a housing 12 with an inlet 14 and an outlet 16 which defines an airflow direction 17 from inlet to outlet. A damper 18 is disposed within the housing 12 and has two spaced apart rotatable blades 15. The rotatable blades 15 are variable or adjustable angle blades and are set open with spaces 22 between the rotatable blades and spaces between the housing 12 and the rotatable blades. The rotatable blades 15 are representative of a set of spaced apart airflow control elements extending across the housing 12 and having the spaces 22 between the elements. The pleated primary filter 24 is disposed within the housing and, in this particular embodiment, the pleated primary filter 24 has a W-shaped cross-section. A disposable pleated charcoal filter 25 containing activated charcoal may also be disposed within the pleated filter 24 as illustrated in FIG. 3.

In the exemplary embodiment of the invention illustrated herein, the pleated filter 24 has pleats 28, each pleat having a pair of adjoining panels 30 that are angled apart from each other along pleat lines 32. An acute angle 34 is defined between each pair of the adjoining panels 30 of each pleat 28. At least one of the pleats 28 is disposed across the spaces 22 between the elements or rotatable blades 15. The filter 24 in the exemplary embodiment is made from a washable filter material such as, for example, woven polypropylene.

Figure 4:
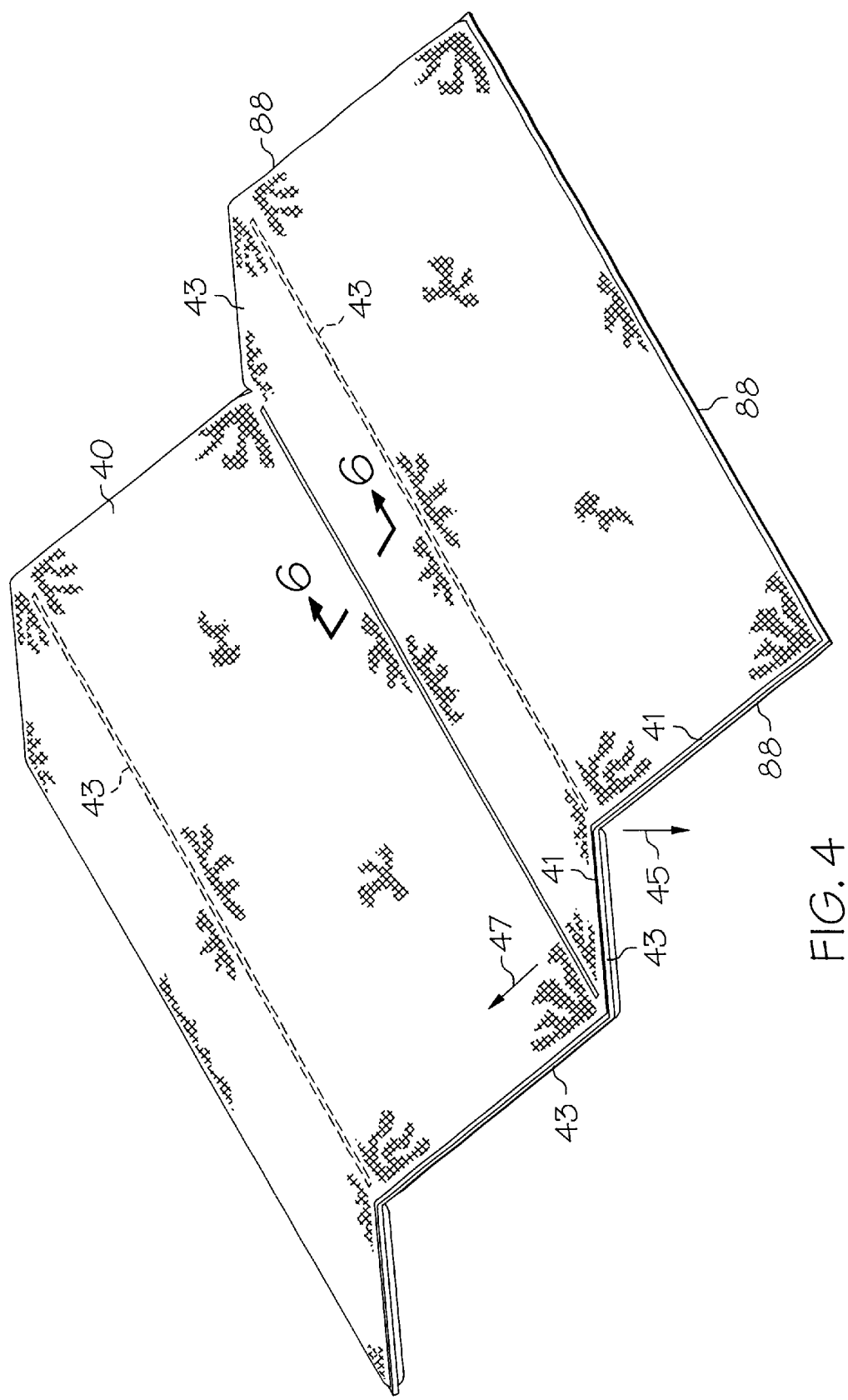
FIG. 4 is an enlarged perspective view illustration of the pleated filter in FIG. 1.
Figure 5:
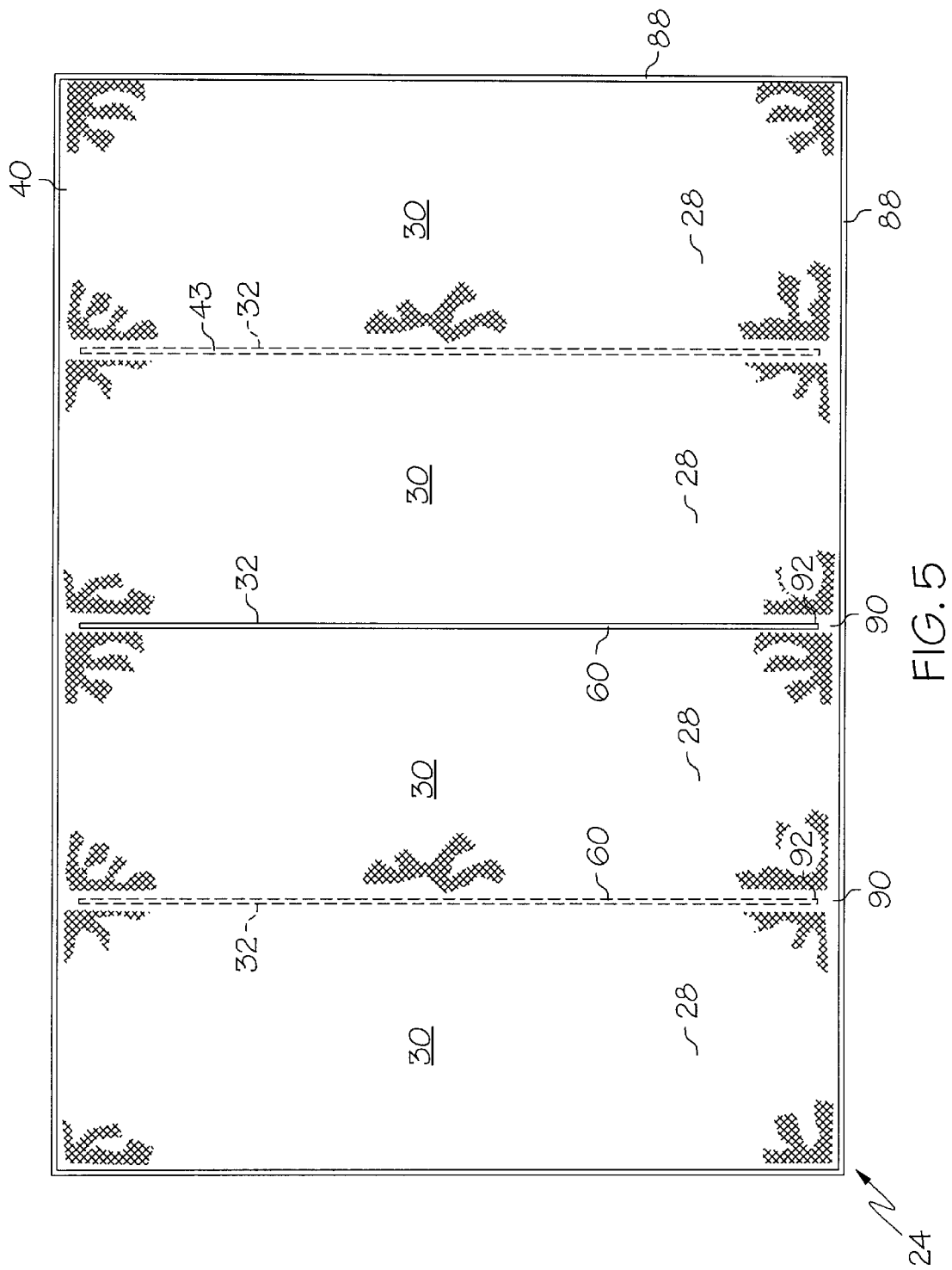
FIG. 5 is a flattened plan form view illustration of the pleated filter in FIG. 4.
Figure 6:
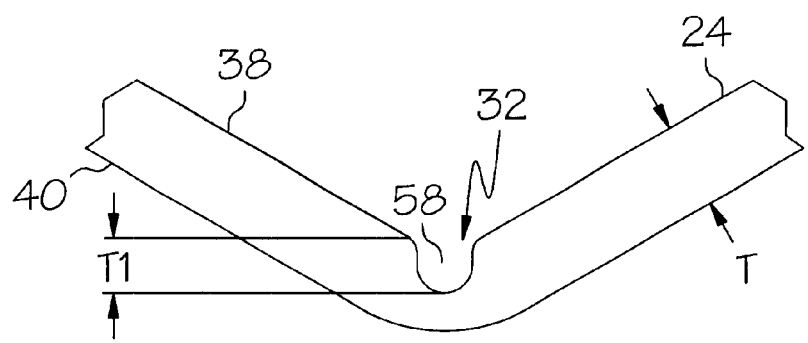
FIG. 6 is a cross-sectional view illustration of a pleat line in the pleated filter through 6—6 in FIG. 4.

Further referring to FIGS. 4 and 5 in this embodiment, the pleat lines 32 are heat sealed between the adjoining panels 30 of each pleats 28. The pleat lines may be made by methods other than heat sealing; however, heat sealing using heated platens has been found to be effective. Heat sealing produces heat sealed edges or lines by melting some of the material of the filter 24. The filter 24 has alternating first and second pleats 41 and 43 that open up in opposite first and second directions 45 and 47, respectively. In the exemplary embodiment illustrated herein, the filter 24 has a W-shaped cross-section and each of the rotatable blades 15 is disposed in a corresponding one of the first pleats 41. There is one second pleat 43 disposed between the two rotatable blades 15 and each of the two remaining second pleats is disposed between one of the two rotatable blades and between rotatable blades and the housing 12.

Referring to FIGS. 2, 4, 5, and 6, the acute angles 34 have apexes 54 along the pleat lines 32. The heat sealed pleat lines 32 extend into the filter 24 a portion T1 of a thickness T of the filter 24 between the opposite first and second sides 38 and 40 forming recesses 58 along the pleat lines that open up to the acute angles 34. Adjacent ones 60 of the heat sealed pleat lines 32 are on opposite ones of the first and second sides 38 and 40.

The filter 24, in the exemplary embodiment of the invention, has finished heat sealed perimeter edges 88 around the periphery of the filter to reinforce the filter and to help maintain the filter's resiliency so it will remain in place within the housing and between the blades. A heat sealer may be used to form the heat sealed pleat lines 32. One such heat sealer being available from the Vertrod Corporation of Brooklyn N.Y. which carries a line of Thermal Impulse Heat Sealing Machinery suitable for this process. Using such a machine, the woven polypropylene material of the filter 24 is gripped by a pair of jaws and the material is heated. During the cooling process, a wire is brought down against the material to form the heat sealed pleat lines 32. Alternating ones of the pleat lines 32 are formed by the wire being brought down on and against the opposite first and second sides 38 and 40 in first and second operations, respectively, to form the pleats. Exemplary settings used for this process are an even pressure across the jaws, in order to seal evenly, in a range of between 50 PSI and 60 PSI and heating temperatures in a range between 250 degrees to 280 degrees F., and a heat impulse dial set at two allows the material only to crease thereby forming suitable pleat lines 32. A cool down temperature in the range of 75 degrees to 115 degrees F. should be reached before removing material from heater bar assembly attached to bottom jaw of heat sealer by Vertrod such as Model 36EWS-WC-HOV-HD. During cool down cycle, the pressure should remain applied until cool down temperature is reached. The polypropylene material should be uniform and laying flat for a proper seal and rigidity. Material must be melted on one side and then moved to another crease operation where the material is melted on an opposite side, to form the alternating pleat lines on opposite sides of the filter 24 and give the polypropylene material a spring-like action. All perimeter edges 88 around the pleated filter 24 should also be heat sealed for structural rigidity and integrity of the pleated filter 24. Preferably, the entire length of each of the pleat lines 32 is not heat sealed so that buffer material 90 at ends 92 of the pleat lines 32 that would otherwise intersect the heat sealed perimeter edges 88 is not heat sealed. The buffer material 90 is at the ends 92 of the pleat lines 32 between pleat lines 32 and the heat sealed perimeter edges 88.

Referring back to FIG. 1, a face-plate 70 having a central area 72 with openings 74 covers the outlet 16 and the rotatable blades 15 are disposed between the inlet 14 and the outlet 16. The openings 74 can also be thought of as spaces between fixed angle blades of the face-plate used for controlling the direction of the airflow leaving the register.

Figure 7:
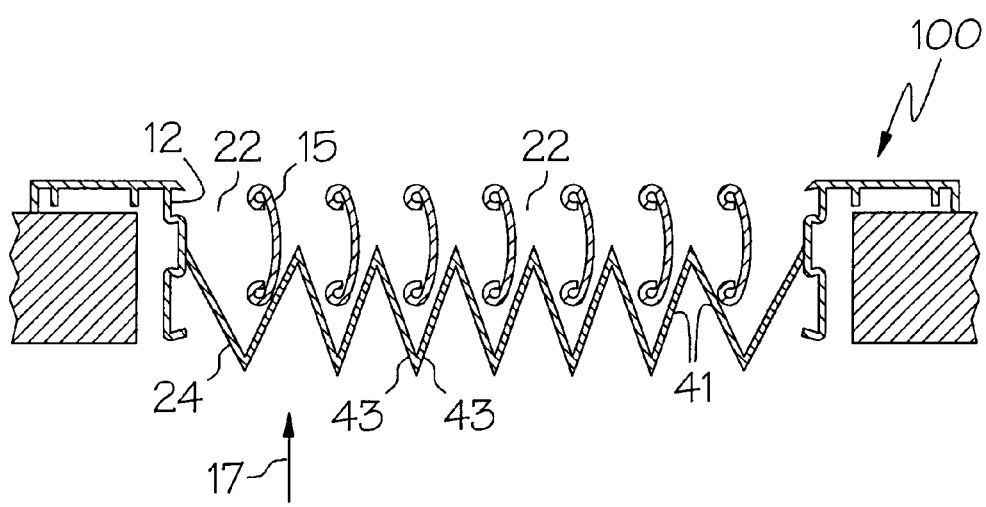
FIG. 7 is a cross-sectional view illustration of a grille having a pleated filter of the present invention disposed between blades of the grille.

In other embodiments of the invention, there may or may not be a face-plate. The air vents may be supply or return grilles with more than just two spaced apart airflow control elements such as fixed angle and/or adjustable angle blades disposed within a grille 100 illustrated in FIG. 7. The filters 24 for these grilles 100 have at least enough pleats 28 and at least one pleat is disposed in each of the spaces 22 between the spaced apart airflow control elements or blades and between the airflow control elements or blades and the housing 12. One of the second pleats 43 is disposed in each of the spaces between the blades 15 and each of the blades is disposed within one of the second pleats 43 that open up in a second direction 47 that is the same as the airflow direction 17.

The present invention provides a filtered air vent such as the register 10 or grille 100 with the pleated filter 24 and such that the pleats are disposed between the blades and between the blades and the housing thus offering greater filtering area and more effective filtering. Existing and installed air vents may be retrofitted with the pleated filter 24 and the pleated filter may be sold or distributed separate from the air vents. In the exemplary embodiments illustrated herein, the pleated filter 24 should be installed such at least one of the pleats 28 is disposed in a corresponding one of the spaces 22 between the blades and spaces between the housing 12 and the blades. In a more particular embodiment, each of the blades is disposed in a corresponding one of the first pleats 41 and each one of the second pleats 43 is disposed in one of the spaces 22 between the blades and between the blades and the housing 12.

Figure 8:
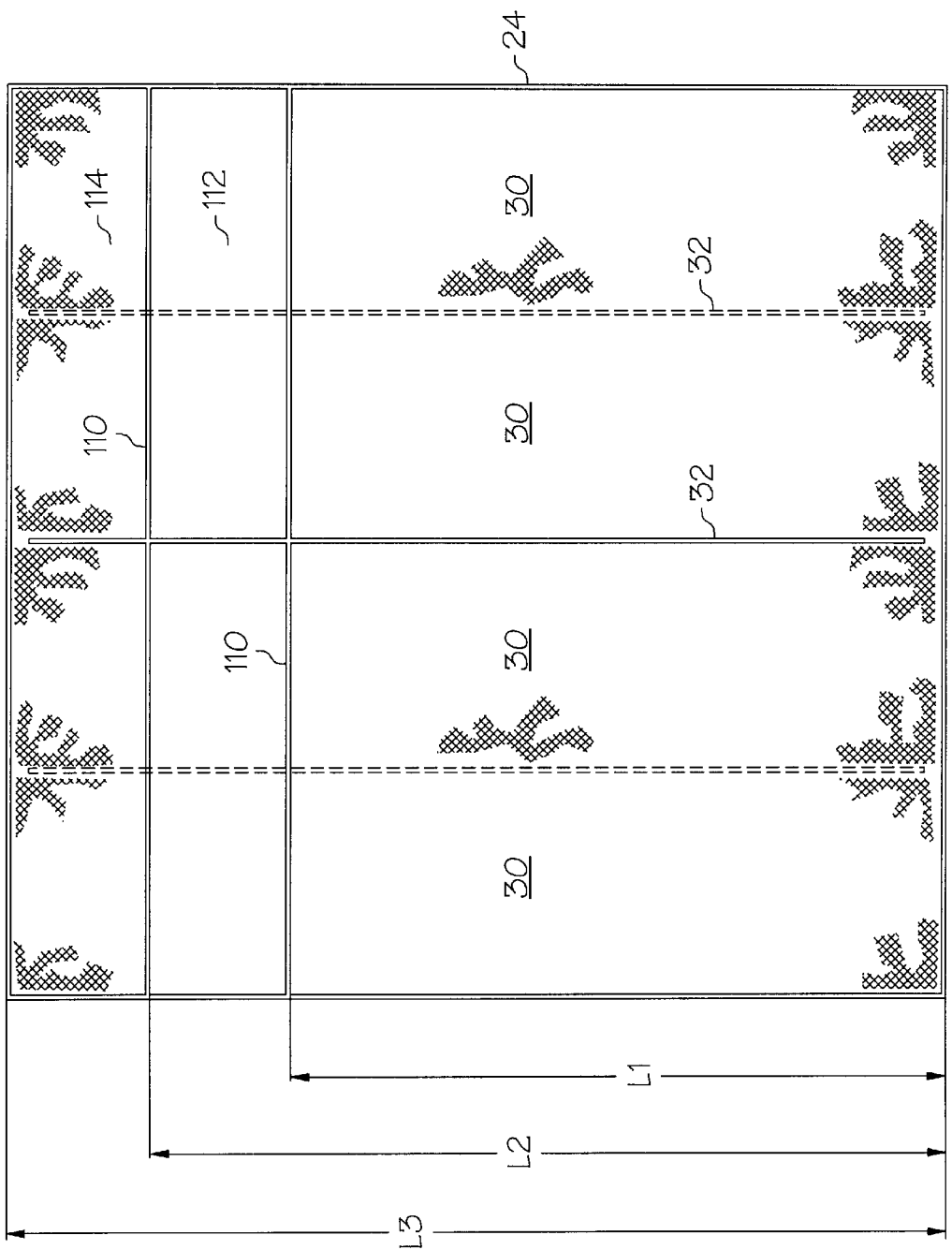
FIG. 8 is a flattened plan form view illustration of an alternative pleated filter with adjustable predetermined lengths.

The pleated filter 24 may be manufactured with predetermined adjustable lengths such as first, second, and third lengths L1, L2, and L3, respectively, as illustrated in FIG. 8. Score lines 110 extending widthwise across the pleated filter 24 substantially perpendicular to the pleat lines 32 may be heat sealed formed using heat sealing as explained above. Other methods may be used to form the score lines 110 as well. The pleated filter 24 may be cut along the score lines to add additional first or second rows of panel extensions 112 and 114, respectively. Air vents used in residential, commercial, and industrial applications such as grilles and floor registers are available in standardized sizes and the predetermined adjustable lengths should be set in accordance with the standardized lengths to the extent that it is possible.

While the preferred embodiment of the present invention has been described fully in order to explain its principles, it is understood that various modifications or alterations may be made to the preferred embodiment without departing from the scope of the invention as set forth in the appended claims.

Accordingly, what is desired to be secured by Letters Patent of the United States is the invention as defined and differentiated in the following claims.

What is claimed is:

1. A filtered air vent comprising:
   a housing with an inlet and outlet,
   at least one set of spaced apart airflow control elements extending across said housing,
   spaces between said elements, and
   a pleated filter disposed within said housing.

2. A filtered air vent as claimed in claim 1 wherein:
   said pleated filter includes pleats,
   each of said pleats having a pair of adjoining panels that are angled apart from each other along pleat lines, and
   at least a portion of said pleats are disposed across said spaces between said elements.

3. A filtered air vent as claimed in claim 2 wherein said filter is made from a washable filter material.

4. A filtered air vent as claimed in claim 3 wherein said washable filter material is woven polypropylene.

5. A filtered air vent as claimed in claim 4 further comprising:
   heat sealed pleat lines between adjoining ones of said panels,
   an acute angle between each pair of said panels of said pleats, and
   said acute angles having apexes along said pleat lines.

6. A filtered air vent as claimed in claim 5 wherein said heat sealed pleat lines extend into said filter a portion of a thickness of said filter between opposite first and second sides second sides of said filter and said heat sealed pleat lines extend into said filter forming recesses along said pleat lines that open up to said acute angles.

7. A filtered air vent as claimed in claim 6 wherein adjoining ones of said heat sealed pleat lines are on opposite ones of said first and second sides.

8. A filtered air vent as claimed in claim 7 further comprising heat sealed perimeter edges around the pleated filter and buffer material that is not heat sealed at ends of said pleat lines between said pleat lines and heat sealed perimeter edges.

9. A filtered air vent as claimed in claim 1 wherein said elements are rotatable blades of a damper disposed within said housing.

10. A filtered air vent as claimed in claim 9 wherein:
    the housing includes an inlet and an outlet,
    a face-plate having a central area with openings covering said outlet,
    wherein said rotatable blades are disposed between said inlet and said outlet.

11. A filtered air vent as claimed in claim 10 further comprising:
    said filter is made from woven polypropylene,
    heat sealed pleat lines between adjoining panels of said pleats,
    an acute angle between each pair of said panels of said pleats, and
    said acute angles having apexes along said pleat lines.

12. A filtered air vent as claimed in claim 11 wherein said filter has alternating first and second pleats that open up in opposite first and second directions respectively and at least one of said rotatable blades is disposed within one of said first pleats.

13. A filtered air vent as claimed in claim 12 wherein each one of said rotatable blades is disposed within a corresponding one of said first pleats and a first portion of said second pleats is disposed between said rotatable blades and at least two other ones of said second pleats are each disposed between said housing and adjacent ones of said rotatable blades.

14. A filtered air vent as claimed in claim 13 wherein said heat sealed pleat lines extend into said filter a portion of a thickness of said filter between opposite first and second sides second sides of said filter and said heat sealed pleat lines extend into said filter forming recesses along said pleat lines that open up to said acute angles.

15. A filtered air vent as claimed in claim 14 further comprising heat sealed perimeter edges around the pleated filter and buffer material that is not heat sealed at ends of said pleat lines between said pleat lines and heat sealed perimeter edges.

16. A filtered air vent as claimed in claim 9 wherein said housing includes an inlet and an outlet and said rotatable blades are disposed at or near said outlet.

17. A filtered air vent as claimed in claim 16 further comprising:
    heat sealed pleat lines between adjoining panels of said pleats,
    an acute angle between each pair of said panels of said pleats, and
    said acute angles having apexes along said pleat lines.

18. A filtered air vent as claimed in claim 17 wherein said filter has alternating first and second pleats that open up in opposite first and second directions respectively and at least one of said rotatable blades is disposed within one of said pleats.

19. A filtered air vent as claimed in claim 18 wherein said filter is made from a washable filter material.

20. A filtered air vent as claimed in claim 19 wherein said washable filter material is woven polypropylene.

21. A filtered air vent as claimed in claim 20 wherein said heat sealed pleat lines extend into said filter a portion of a thickness of said filter between opposite first and second sides second sides of said filter and said heat sealed pleat lines extend into said filter forming recesses along said pleat lines that open up to said acute angles.

22. A filtered air vent as claimed in claim 21 further comprising heat sealed perimeter edges around the pleated filter and buffer material that is not heat sealed at ends of said pleat lines between said pleat lines and heat sealed perimeter edges.

23. A filtered air vent as claimed in claim 1 wherein said housing includes an inlet and an outlet and said elements are fixed vanes disposed at or near said outlet.

24. A filtered air vent as claimed in claim 23 further comprising:

pleat lines between adjoining ones of said pleats, an acute angle between each pair of said panels of said pleats, and said acute angles having apexes along said pleat lines.

25. A filtered air vent as claimed in claim 24 wherein said filter has alternating first and second pleats that open up in opposite first and second directions respectively and at least one of said vanes is disposed within one of said pleats.

26. A filtered air vent as claimed in claim 25 wherein said filter is made from a washable filter material.

27. A filtered air vent as claimed in claim 26 wherein said washable filter material is woven polypropylene.

28. A filtered air vent as claimed in claim 27 wherein said heat sealed pleat lines extend into said filter a portion of a thickness of said filter between opposite first and second sides second sides of said filter and said heat sealed pleat lines extend into said filter forming recesses along said pleat lines that open up to said acute angles.

29. A filtered air vent as claimed in claim 28 further comprising heat sealed perimeter edges around the pleated filter and buffer material that is not heat sealed at ends of said pleat lines between said pleat lines and heat sealed perimeter edges.

30. A pleated filter comprising a W shaped cross-section only two first pleats and one second pleat wherein said first pleats and second pleat open up in opposite first and second directions respectively.

31. A pleated filter as claimed in claim 30 wherein said filter is made from a washable filter material.

32. A pleated filter as claimed in claim 31 wherein said washable filter material is woven polypropylene.

33. A pleated filter as claimed in claim 32 further comprising:

opposite first and second sides of said filter, heat sealed pleat lines between adjoining panels of said pleats, an acute angle between each pair of said panels of said pleats, and said acute angles having apexes along said pleat lines.

34. A pleated filter as claimed in claim 33 further comprising one or more score lines extending widthwise across said pleated filter substantially perpendicular to said pleat lines delineating additional row or rows of panel extensions.

35. A pleated filter as claimed in claim 34 wherein said one or more score lines are heat sealed.

36. A pleated filter as claimed in claim 35 wherein said heat sealed pleat lines extend into said filter a portion of a thickness of said filter between said opposite first and second sides and said heat sealed pleat lines extend into said filter forming recesses along said pleat lines that open up to said acute angles.

37. A pleated filter as claimed in claim 31 further comprising:

opposite first and second sides of said filter, heat sealed pleat lines between adjoining panels of said pleats, an acute angle between each pair of said panels of said pleats, said acute angles having apexes along said pleat lines, heat sealed perimeter edges around said pleated filter, and buffer material that is not heat sealed between ends of said pleat lines and said heat sealed perimeter edges.

38. A pleated filter as claimed in claim 37 wherein said heat sealed pleat lines extend into said filter a portion of a thickness of said filter between said opposite first and second sides and said heat sealed pleat lines extend into said filter forming recesses along said pleat lines that open up to said acute angles.

39. A pleated filter as claimed in claim 38 wherein adjoining ones of said heat sealed pleat lines are on opposite ones of said first and second sides.

* * * * *